United States Patent [19]
Weijand

[11] Patent Number: 6,128,671
[45] Date of Patent: Oct. 3, 2000

[54] TACTILE FEEL DEVICE HAVING A PLURALITY OF PINS THAT ALLOW A USER TO READ INFORMATION FROM THE PINS AND MAKE SELECTION BY DEPRESSING THE PINS

[75] Inventor: Koen J. Weijand, Rockanje, Netherlands

[73] Assignee: F.J. Tieman B.V., Rockanje, Netherlands

[21] Appl. No.: 09/080,851

[22] Filed: May 18, 1998

[51] Int. Cl.[7] .................................................. G06F 13/14
[52] U.S. Cl. .............................. 710/5; 340/825; 345/161; 345/163; 345/166
[58] Field of Search .................... 345/161, 163, 345/166; 340/825; 710/5

[56] References Cited

U.S. PATENT DOCUMENTS

| | | | |
|---|---|---|---|
| 4,044,350 | 8/1977 | Tretiakoff et al. | 340/407.2 |
| 4,305,067 | 12/1981 | Tretiakoff et al. | 340/407.2 |
| 4,478,165 | 10/1984 | Strain | 114/74 R |
| 4,758,165 | 7/1988 | Tiemann et al. | 434/114 |
| 4,985,692 | 1/1991 | Breider et al. | 340/407 |
| 5,226,817 | 7/1993 | Nakajima et al. | 434/113 |
| 5,293,464 | 3/1994 | Hirano et al. | 395/101 |
| 5,407,285 | 4/1995 | Franz | 400/490 |
| 5,426,837 | 6/1995 | Tieman | 29/25.35 |
| 5,449,292 | 9/1995 | Tami et al. | 434/114 |
| 5,636,051 | 6/1997 | Lim | 359/290 |
| 5,685,720 | 11/1997 | Kashi | 434/114 |
| 5,714,978 | 2/1998 | Yamanaka et al. | 345/157 |
| 5,736,978 | 4/1998 | Hasser et al. | 345/173 |
| 5,784,052 | 7/1998 | Keyson | 345/167 |
| 5,912,660 | 6/1999 | Gouzman et al. | 345/163 |
| 5,973,670 | 10/1999 | Barber et al. | 345/157 |
| 5,973,674 | 10/1999 | Buecker | 345/166 |
| 6,020,876 | 2/2000 | Rosenberg et al. | 345/157 |
| 6,028,593 | 2/2000 | Rosenberg et al. | 345/156 |

FOREIGN PATENT DOCUMENTS 0 284 113 9/1988 European Pat. Off. .

OTHER PUBLICATIONS

Piezoelectric Transducers, Chapter 5, pp. 111–118.

*Primary Examiner*—Thomas C. Lee
*Assistant Examiner*—Abdelmoniem Elamin
*Attorney, Agent, or Firm*—Samuels, Gauthier & Stevens, LLP

[57] ABSTRACT

A Braille device includes a plurality of Braille cells that comprise a plurality of pins that are actively positioned to present information to a user via tactile feel. The Braille device also allows the user to depress at one or more of the pins in order to make a selection analogous to point and click of a mouse. To allow the user to move a screen cursor and make selections via the Braille pins, the Braille cell includes pin position sensing circuitry that senses the position of each of the plurality of Braille pins. A system controller (e.g., a CPU) reads the information from the sensing circuitry to determine which pins, if any have been depressed. Advantageously, the Braille pins are used as an output device that allows a user to read information, and also as an input device by allowing the user to depress the Braille pins in order to make a selection. In addition, depositing the electronics onto the piezoelectric bimorph reduces the overall size of the Braille device.

8 Claims, 6 Drawing Sheets

TACTILE FEEL DEVICE HAVING A PLURALITY OF PINS THAT ALLOW A USER TO READ INFORMATION FROM THE PINS AND MAKE SELECTION BY DEPRESSING THE PINS

TECHNICAL FIELD

The invention relates to a tactile feel device, and in particular to a device such as a Braille device having a plurality of cells each comprising a plurality of pins, that allow a user to read information from the pins and make selections by depressing the pins.

BACKGROUND OF THE INVENTION

A reading technique widely used by the blind and visually impaired is the Braille system. This system represents various alphanumeric characters as a geometric figure formed by a plurality of points in relief up to a maximum of eight. These geometric figures are quickly and easily recognized by a trained user.

To allow a visually impaired user to use a computer, Braille readers have been integrated into personal computers and workstations. For example, European Patent Application 0 284 113, entitled "Work Station Comprising A Braille Reading Line" discloses a computer workstation having a keyboard which includes a Braille reading line. The workstation also includes a separate cursor control mechanism positioned adjacent to the Braille reading line. This control mechanism allows a visually impaired workstation user to move the cursor to a desired location. As disclosed in the above identified European application, a user reads the position of the cursor using the Braille reading line, and then moves his fingers to the cursor control mechanism to position the cursor. A problem with this system is that the user must move his fingers to the cursor control mechanism to reposition the cursor and then move his fingers back to the Braille reading line to continue reading.

With the emergence of computer graphical user interfaces and the worldwide web (WWW), users typically navigate between applications and/or websites by "pointing and clicking" using various pointing devices. For example, with a mouse, a user typically positions the mouse and double clicks on the menu location or the hyperlink. A problem with the system disclosed in the above identified European application is that is does not facilitate "pointing and clicking" since the user must constantly reposition his figures between the Braille reading line and the cursor control mechanism. This makes it more difficult for a visually impaired person to navigate the WWW.

Another problem with prior art Braille devices are their size. There is a constant desire to decrease the size of these devices.

Therefore, there is a need for a device that allows a user to read text on a tactile feel device such as a Braille device for the visually impaired, and easily move a cursor and make screen selections. There is also a need to reduce the size of Braille devices.

SUMMARY OF THE INVENTION

An object of the present invention is to provide a tactile feel device, such as a Braille device, that allows a user to read text and graphics via a plurality of pins, and also input information by depressing one or more of the pins.

A further object is to decrease the size of Braille devices.

According to the present invention, an input/output tactile feel device includes a plurality of cells that each comprise a plurality of pins that are actively positioned by pin positioning actuators to present information to a user via tactile feel. The device also includes pin movement detection circuitry that detects when a user has depressed at least one of the pins.

According to another aspect of the invention, a Braille cell includes a bimorph piezoelectric positioning reed that includes integrated electronics. An insulation layer is deposited onto the piezoelectric reed, and the electronics are deposited onto the insulation layer.

In a preferred embodiment, the tactile feel device is a Braille device.

To allow the user to move a screen cursor and make selections via the pins, each cell includes pin movement sensing circuitry that senses the user's movement of the pins. A system controller (e.g., a digital signal processor) reads the information from the sensing circuitry and determines which pins have been depressed and the direction of movement of the user's fingers over the depressed pins. For example, the controller detects whether the direction of movement was from top-to-bottom, bottom-to-top, left-to-right, or right-to-left.

Advantageously, the present invention provides a combined actuator and sensing system. Specifically, the pins of the input/output tactile feel device are used both as an output device that allows a user to read information, and as an input device which are used to depress the pins to make a selection or move a cursor. In addition, depositing the electronics onto the piezoelectric bimorph reduces the overall size of the device.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
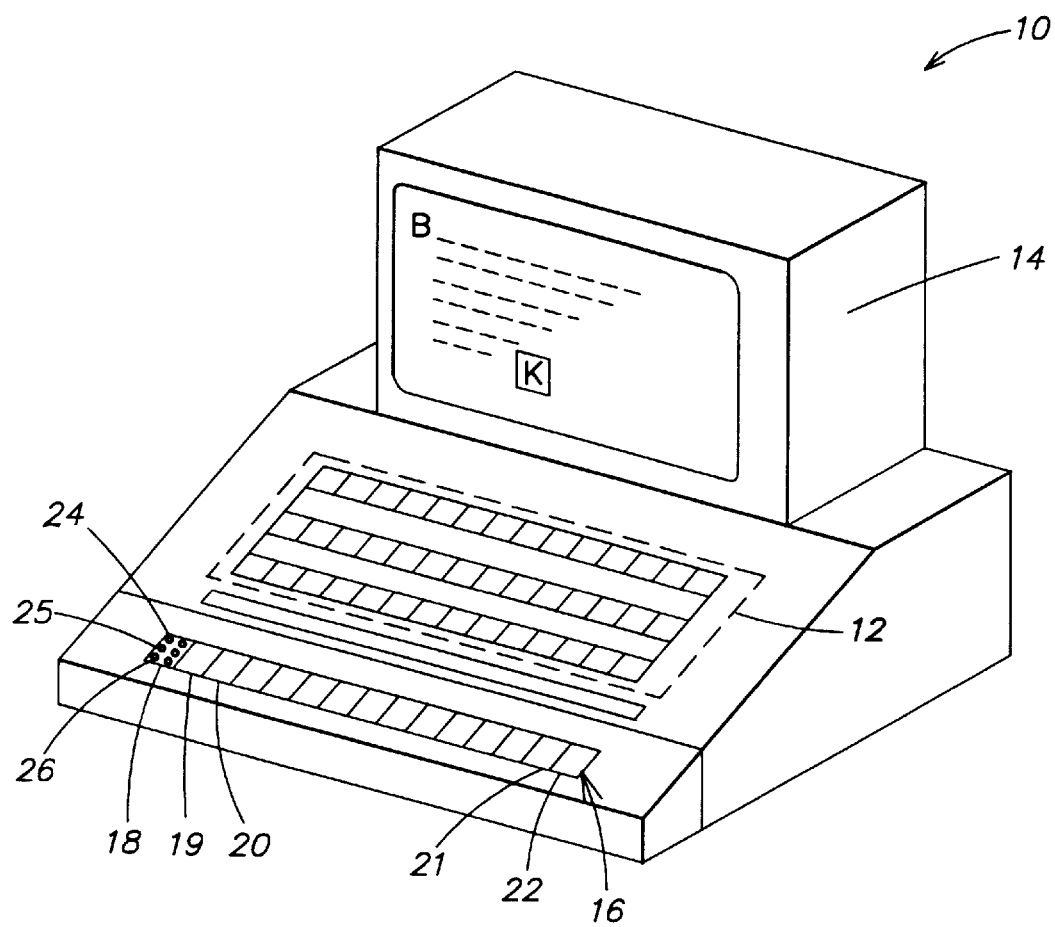
FIG. 1 illustrates a functional block diagram of a personal computer including an input/output tactile feel device.

Referring to FIG. 1, a personal computer (PC) 10 includes a conventional keyboard 12, a display 14 and a CPU (not shown). The PC 10 also includes an input/output tactile feel device 16 comprising a plurality of cells 18–22. The input/output tactile feel device 16 may either be integral with the PC or an add-on item to the PC. Each of the cells 18–22 allows a trained user (e.g., a visually impaired person) to read information based upon the vertical position of a plurality of pins (e.g., 24–26) within the cell. According to an aspect of the present invention, the tactile feel device is a combined actuator and sensing system. That is, the trained user can read information by passing his fingers over the pins, and depress selected pins to control the positioning of a cursor on the display 14 or make selections, such as a hyperlink.

Figure 2:
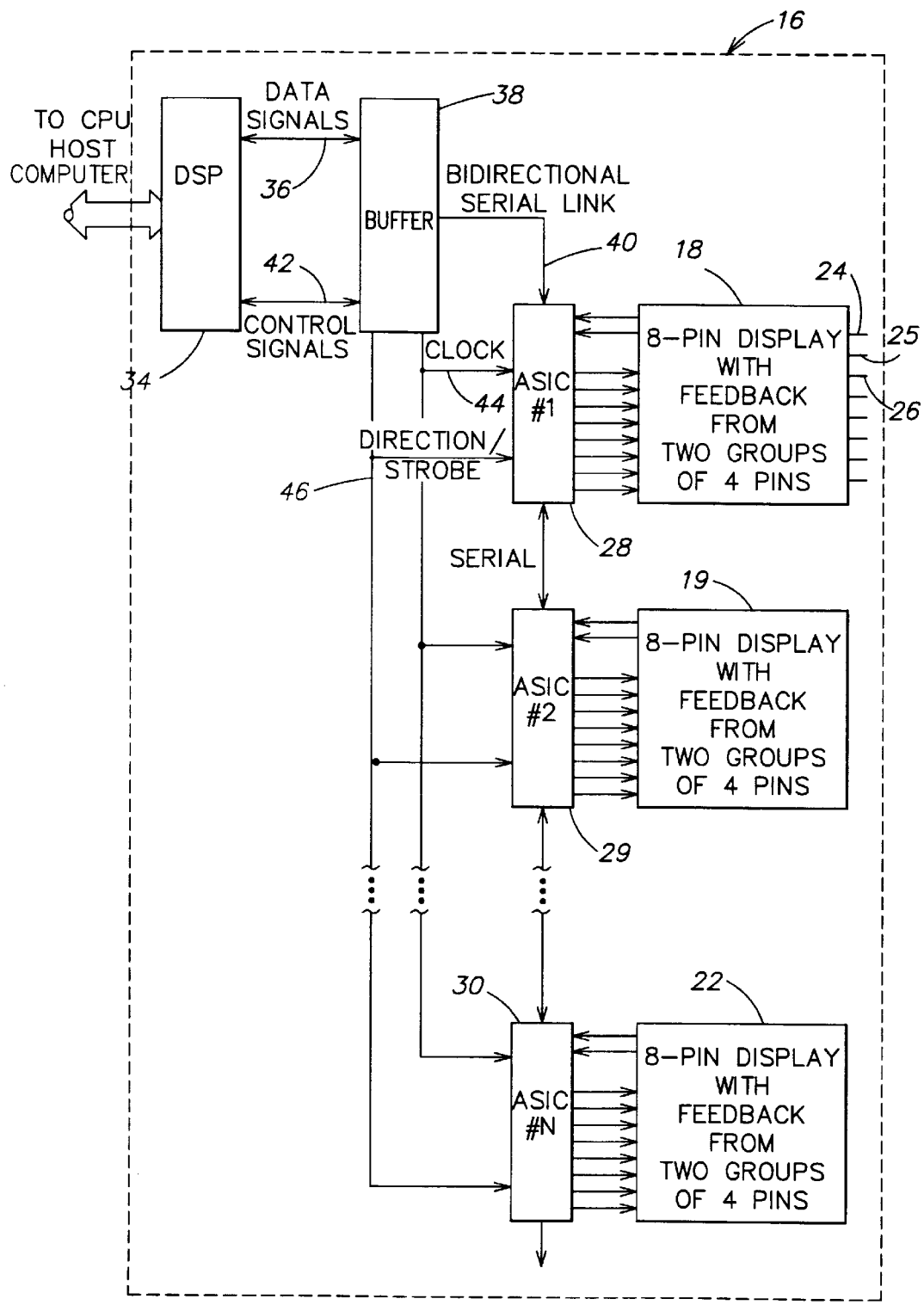
FIG. 2 illustrates a functional block diagram of the input/output tactile feel device.

FIG. 2 illustrates a functional block diagram of the input/output tactile feel device 16. The device 16 includes a plurality of application specific integrated circuits (ASICs) 28–30, each associated with one of the cells 18, 19 and 22. Each ASIC includes a drive circuit to actuate the pins, and a pin movement sensing circuit that detects when a user has depressed any one of the pins. The details of these circuits shall be discussed herein below.

The invention shall be discussed in the context of a Braille cell. However, one of ordinary skill in the art will recognize that the inventive system of the present invention may use systems other than Braille.

The device 16 includes a digital signal processor (DSP) 34 that communicates with a CPU (not shown) of the PC. The DSP (e.g., a Texas Instruments TMS320C542) generates pin position command signals that are provided on a line 36 to a read/write buffer 38. The buffer provides the pin position command signals to the ASICs 28–30. The DSP also provides control signals on a bus 42 to the read/write buffer 38. These control signals include a clock signal which the buffer provides on a line 44 to the ASICs 28–30, and a direction/strobe control signal on a line 46 which is provided to the ASICs. The direction/strobe signal controls the direction of the data flow on the serial link, and strobes sequential circuitry (not shown) in each of the ASICs for synchronous system operation.

Figure 3:
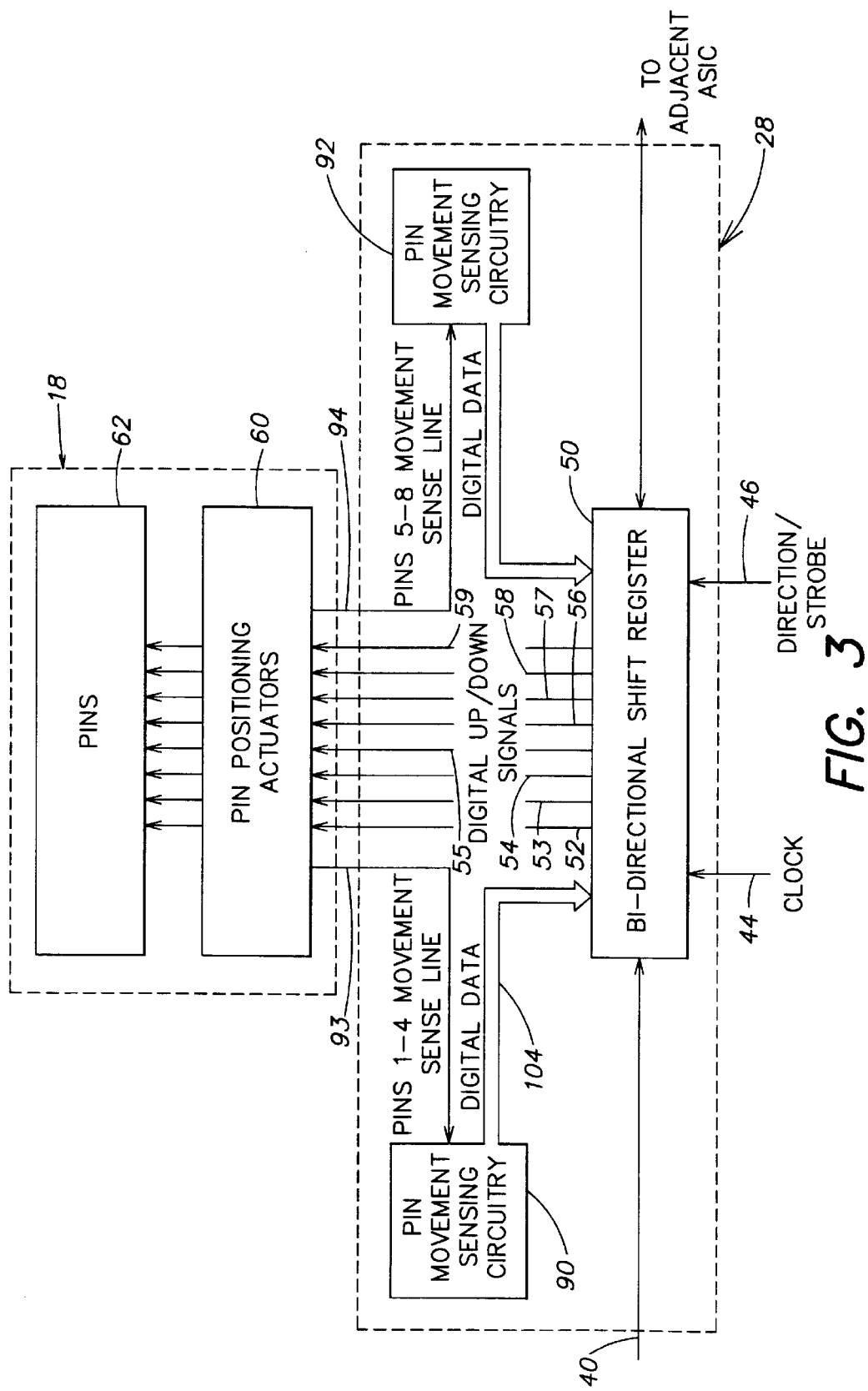
FIG. 3 illustrates a functional block diagram of pin positioning and movement sensing circuitry.

FIG. 3 illustrates a functional block diagram of the ASIC 28 and the cell 18. The ASIC includes a bi-directional shift register 50 that receives the clock signal on the line 44, the direction/strobe signal on the line 46 and data on the directional serial link 40 from the buffer 38. The data is shifted into the shift register 50, and once the desired data is correctly positioned in the register, the register outputs a plurality of position control signals on lines 52–59 each uniquely associated with one of the pins. Each position control signal is preferably a Boolean signal, wherein a high voltage (e.g., 5 volts) indicates that the associated pin should be placed in the up position, while a low voltage (e.g., 0 volts) indicates that the pin should be placed in the down position. The bimorph reeds are described in detail in U.S. Pat. Nos. 4,758,165 and 5,426,837 both assigned to the assignee of the present invention. In the interest of brevity those details shall not be repeated herein, and accordingly these patents are hereby incorporated by reference. The position control signals are applied to pin positioning actuators 60 which are used to position pins 62. In a preferred embodiment, the pin positioning actuators 60 include a plurality of piezoelectric bimorph reeds, each uniquely associated with one of the pins.

Figure 4:
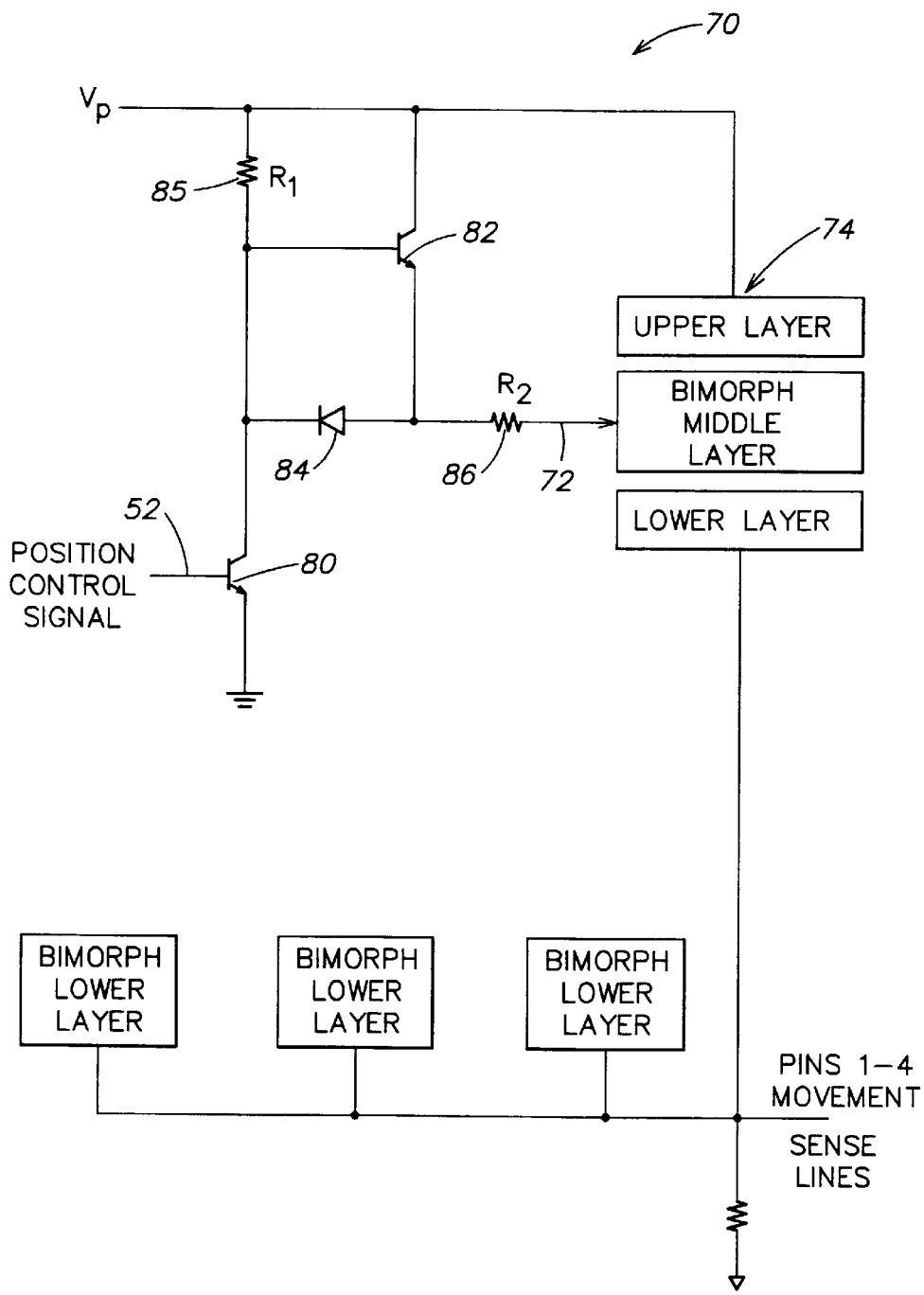
FIG. 4 is a schematic illustration of actuator driver electronics used to position the pins.

FIG. 4 is a schematic illustration of a representative one 70 of the pin positioning actuators. The actuator 70 receives an associated one of the position control signals on the line 52. If the position control signal is set (i.e., a logical "1",+5 vdc), the actuator 70 provides a command signal on a line 72 that causes a piezoelectric bimorph 74 to extend the associated Braille pin. Similarly, when the position control signal is cleared (i.e., a logical "0", 0 vdc) the actuator 70 drives the command signal on the line 72 to cause the bimorph 74 to position the pin in the down position. In one embodiment, the actuator includes transistors 80, 82, a diode 84 and resistors $R_1$ 85, $R_2$ 86. Representative values of $R_1$ 85, $R_2$ 86 are 20 Mohm and 330 Kohms, respectively.

Figure 5:
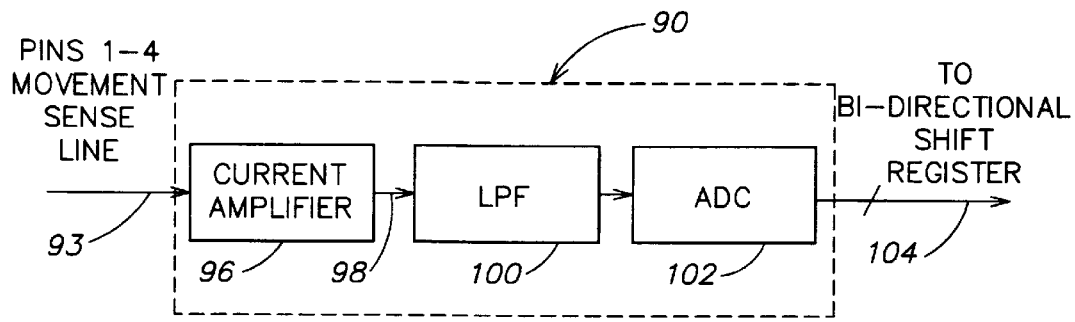
FIG. 5 is a functional block diagram of pin movement sensing circuitry.

Referring again to FIG. 3, the ASIC 28 also includes pin movement sensing circuitry 90, 92. The sensing circuitry 90 receives the pins 1–4 movement sense signal on line 93, and sensing circuitry 92 receives the pins 5–8 movement sense signal on line 94. FIG. 5 illustrates a functional block diagram of the sensing circuitry 90. The circuitry 90 receives the pins 1–4 movement sense signal on the line 93 and inputs the signal to a current amplifier 96. The amplifier 96 provides an amplified signal on a line 98 to a low pass filter (LPF) 100 that provides a filtered signal to an analog-to-digital converter (ADC) 102. The ADC 102 provides a digitized movement signal on a plurality of parallel lines 104 (e.g., eight lines) which are input to the bi-directional shift register 50 (FIG. 3).

Figure 6:
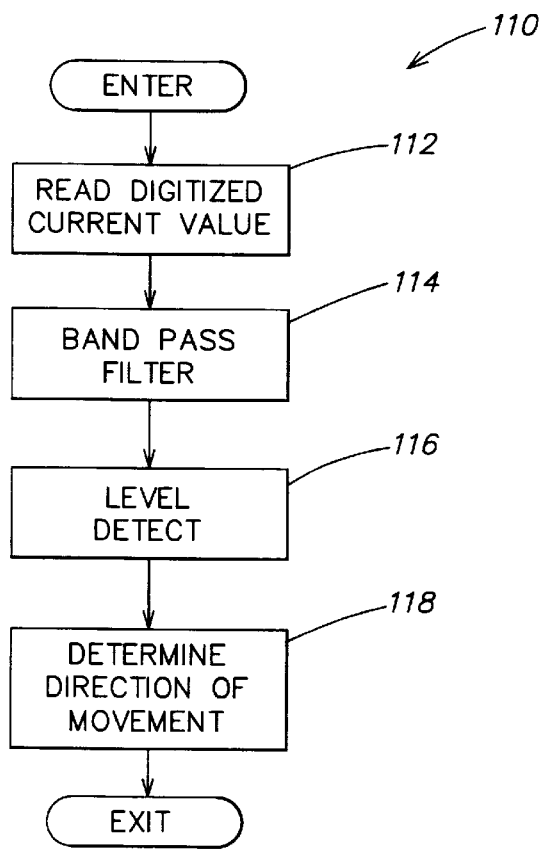
FIG. 6 illustrates a software routine that is executed by the DSP to determine if the pins have moved and the direction of movement.

Referring again to FIGS. 2–3, the movement data on the plurality of parallel lines 104 is input to the bidirectional shift register 50 which shifts the data to the read/write buffer 38 where the DSP 34 can access the data. The DSP 34 then processes the movement data to determine which pins have been moved. FIG. 6 illustrates a software routine 110 that is executed by the DSP 34 to determine if the pins have moved and the direction of movement. The routine 110 executes step 112 to read the digitized current value from the buffer 38 (FIG. 2). Step 114 is then executed to band pass filter the digitized current value to reduce the likelihood of detecting inadvertent movements over of the pins. Next step 116 is executed to determine if the value of the digitized current signal exceeds a predetermined value, which is representative of a movement threshold. Step 118 is then performed to compare the value of the present value of the digitized current signal and past values of the digitized current signal to determine the direction of movement of the user's fingers along the pins. In general, the DSP allows the movement detection parameters to be easily adjusted in software (e.g., via a Windows dialog box) to match a user's particularity. In addition, calibration of individual cells can be performed in software after the cell has been produced.

To reposition the cursor on the display 14 (FIG. 1), launch an application program or select a website hyperlink, the user depresses the associated pins in the cell analogous to a conventional pointing device such as a mouse. The pin movement sensing circuitry 90, 92 then detects which pins have been depressed. Specifically, when the user depresses a pin, the downward vertical force applied by the user is coupled to the piezoelectric bimorph. This force creates a charge displacement in the bimorph, creating an electric current. In one embodiment, four pins are coupled to together. For example, if a user depresses anyone of pins 1, 2, 3 or 4, then the pins 1–4 movement sense signal on the line 93 (FIG. 3) indicates that one or more of these pins have been depressed. Similarly, if any one of pins 5, 6, 7 or 8 have been depressed, pins 5–8 movement sense signal on line 94 (FIG. 3) will indicate this. In an alternative embodiment, rather than coupling four pins to a sense signal, each pin can include its own current sense line.

Figure 7:
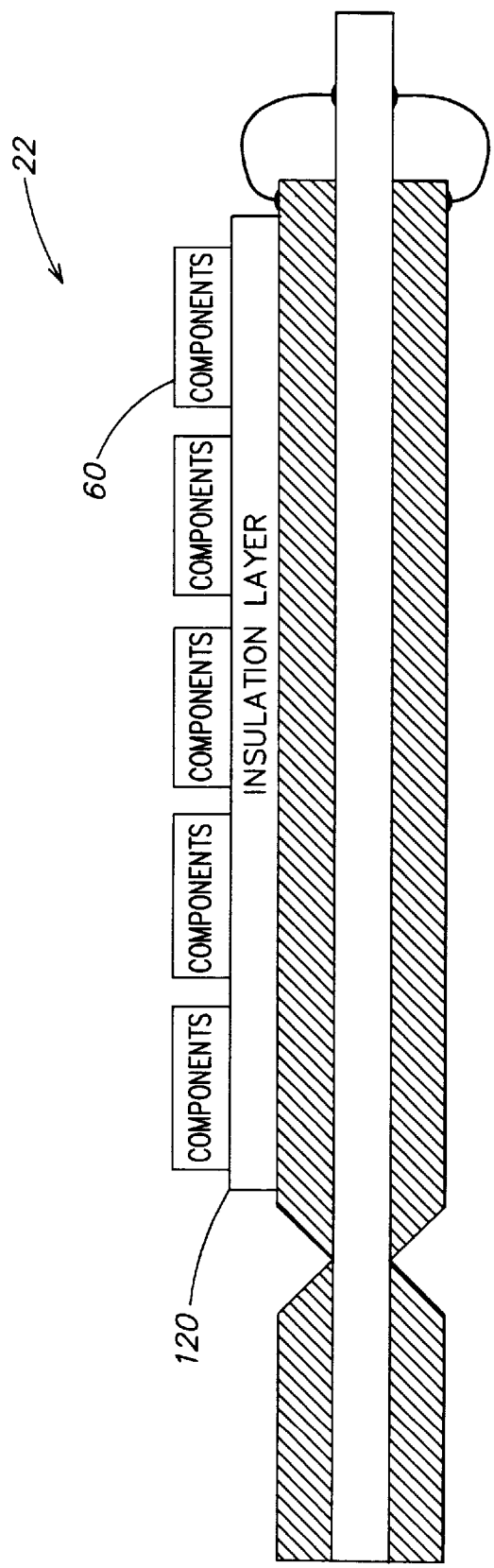
FIG. 7 is a cross sectional illustration of a piezoelectric reed including integrated electronics disposed thereon.

According to another aspect of the invention, the pin positioning actuators are integrated onto the bimorph actuator. FIG. 7 illustrates a cross sectional view of a multi-layer bimorph having an insulation layer 120 that separates the multi-layer bimorph from electronic circuitry. The pin positioning actuators are deposited over the insulating layer 120 by conventional deposition techniques, including thick film deposition. To reduce the effect the flexing of the bimorph will have upon the deposited electronics, triangular regions (less than about 3 µm deep) are cut from the outer layers of the piezoelectric bimorph adjacent to the deposited electronics. These regions can be removed by conventional techniques, including laser-cutting. To further reduce the bending of the bimorph in the region where the electronics are deposited, electrical connections are established between the bimorph middle layer (i.e., the thin conducting leaf) and the bimorph outer layer regions (i.e., the conducting layers) adjacent to where the electronics are deposited.

Although the present invention has been discussed in the context of a Braille cell, it is contemplated that cells of various sizes may be used. For example, the cell may include a plurality of pins arranged as an M×N matrix (e.g., 480×640 pins) to display graphical information. After feeling the pins to determine the graphical shape represented by the pins, the user would depress the pins associated with the shape to select a feature or options defined by the pins. In addition, the cells can be arranged as a horizontal slider by setting a row of cells high. Depressing a cell forces all the pins in the row down and forces the remaining pins up. A "knob" position can be sensed tactically by sensing the only down cell.

Although the present invention has been shown and described with respect to several preferred embodiments thereof, various changes, omissions and additions to the form and detail thereof, may be made therein, without departing from the spirit and scope of the invention.

What is claimed is:

1. An input/output tactile feel device, comprising:

a plurality of pins each capable of outputting information from and inputting information to said tactile feel device;

means for positioning said pins to provide information to a user via tactile feel; and means for sensing movement of said pins to determine if the user has depressed any of said plurality of pins.

2. The device of claim 1, wherein said means for sensing comprises pin movement sensing circuitry that comprises a piezoelectric bimorph reed that provides an electrical signal indicative of whether any of said plurality of pins is depressed and means for determining the direction of movement along said pins.

3. The device of claim 1, wherein said means for positioning comprises pin positioning actuators that include driver electronics which provide pin position command signals to said plurality of pins.

4. The device of claim 3, wherein said means for sensing comprises a plurality of ASICs.

5. The device of claim 1, wherein said plurality of pins are arranged as a Braille device.

6. The device of claim 1, wherein said plurality of pins are arranged in a M×N matrix.

7. An input/output tactile feel device, comprising:

a plurality of pins capable of outputting information from and inputting information to said tactile feel device;

pin actuator circuitry that positions said pins to provide information to a user via tactile feel; and a pin movement sensing circuit that senses movement of said pins to determine if the user has depressed any of said plurality of pins.

8. An input/output tactile feel device, comprising:

a plurality of pins capable of being driven between a first position and a second position for outputting information from and inputting information to said tactile feel device;

pin actuator circuitry that positions in either said first position or said second position to provide information to a user via tactile feel; and a pin movement sensing circuit that senses if the user has depressed any of said plurality of pins.

* * * * *